United States Patent
Masubuchi et al.

(10) Patent No.: US 7,744,226 B2
(45) Date of Patent: Jun. 29, 2010

(54) PROJECTION TYPE IMAGE DISPLAY APPARATUS

(75) Inventors: Tomokazu Masubuchi, Osaka (JP); Atsushi Matsuura, Sakai (JP); Satoshi Onishi, Amagasaki (JP); Kohei Watasru, Sakai (JP); Takashi Ohta, Sakai (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 1020 days.

(21) Appl. No.: 11/384,645

(22) Filed: Mar. 20, 2006

(65) Prior Publication Data

US 2006/0221306 A1 Oct. 5, 2006

(30) Foreign Application Priority Data

Mar. 31, 2005 (JP) .............................. 2005-104392

(51) Int. Cl.
G03B 21/28 (2006.01)
G03B 21/14 (2006.01)
G03B 21/22 (2006.01)
H04N 5/74 (2006.01)

(52) U.S. Cl. .......................... 353/99; 353/119; 348/771

(58) Field of Classification Search .................. 353/98, 353/99, 77, 78, 72, 74, 119, 97; 348/771, 348/742, 743, 798, 789; 359/858, 859, 864
See application file for complete search history.

(56) References Cited

U.S. PATENT DOCUMENTS

| | | | |
|---|---|---|---|
| 6,179,424 B1 * | 1/2001 | Sawamura | 353/33 |
| 6,348,907 B1 * | 2/2002 | Wood | 345/84 |
| 6,349,006 B1 * | 2/2002 | Okamori et al. | 359/834 |
| 6,357,878 B1 * | 3/2002 | Sawamura | 353/33 |
| 6,560,048 B1 | 5/2003 | Okamori et al. | 359/833 |
| 6,621,529 B2 * | 9/2003 | Ohara et al. | 348/743 |
| 6,779,894 B2 | 8/2004 | Shiraishi et al. | 353/57 |
| 6,779,898 B2 * | 8/2004 | Wang | 353/99 |
| 6,886,947 B2 | 5/2005 | Konishi | 353/119 |
| 7,149,041 B2 * | 12/2006 | Hsu et al. | 359/820 |
| 7,301,691 B2 * | 11/2007 | O'Donnell | 359/291 |
| 7,360,906 B2 * | 4/2008 | Onishi et al. | 353/119 |
| 7,397,536 B2 * | 7/2008 | Shimizu | 355/67 |
| 2001/0040669 A1 * | 11/2001 | Aoto et al. | 353/20 |

FOREIGN PATENT DOCUMENTS

JP 2001-166255 (A) 6/2001

* cited by examiner

Primary Examiner—Georgia Y Epps
Assistant Examiner—Ryan Howard
(74) Attorney, Agent, or Firm—Sidley Austin LLP

(57) ABSTRACT

A projection type image display apparatus has: an illumination optical system generating illumination light; a projection optical system projecting an image light onto a screen; a digital micromirror device (DMD) modulating the illumination light so as to form the image light; and a reflection mirror arranged in a position opposite to an optical path of the illumination light entering the DMD. The reflection mirror reflects an off-light reflected by the DMD in an "OFF" state in a direction separated from a projection light reflected by the DMD in an "ON" state.

11 Claims, 16 Drawing Sheets

PROJECTION TYPE IMAGE DISPLAY APPARATUS

This application is based on the application No. 2005-104392 filed in Japan Mar. 31, 2005, the entire content of which is hereby incorporated by reference.

BACKGROUND OF THE INVENTION

1. Field of the Invention

The present invention relates to a projection type image display apparatus that projects an image formed by a reflection type image forming device.

2. Description of the Related Art

A projection type image display apparatus where a digital micromirror device (DMD) modulates illumination light from an illumination optical system, a projection optical system enlarges and projects the modulated image light onto a screen is known. DMD is a microdisplay manufactured by Texas Instruments Incorporated. DMD has an image forming surface which is constituted so that micromirrors which can be set at any one of two rotational angles according to an input picture signal are arranged two-dimensionally. The micromirror which is set at one of the two angles reflects illumination light in a direction led to the projection optical system (hereinafter, such reflected light is called as projection light or image light). The micromirror which is set at the other angle reflects the illumination light in a direction which is not led to a screen (hereinafter, such reflected light is called as off light or unnecessary light).

The off light causes heat generation in the device. Further, when the off light enters the projection optical system and becomes harmful light which is imaged on the screen, deterioration in image quality such as deterioration in contrast is caused. For this reason, various handlings of the off light are proposed. For example, U.S. Pat. No. 6,560,048 B1 and Japanese Patent Application Laid-Open No. 2001-166255 disclose projection type image display apparatuss which are constituted so that off light is totally reflected by a prism provided to the projection optical system in a direction different from that of projection light and is absorbed by a light absorbing member. Further, U.S. Pat. No. 6,886,947 B2 discloses a projection type image display apparatus which is constituted so that illumination light is emitted from an approximately front of DMD, and off light is absorbed by a light absorbing member.

A system, which emits illumination light emitted from below by an illumination optical system to an upper part by a reflection type image forming device, is called as a bottom-light type system. The bottom-light type projection type image display apparatus, in which a center principal ray of the illumination light to enter the reflection type image forming device is on the same plane as a center principal ray of the projection light, can project an image onto a large-scale screen with a comparatively simple and inexpensive constitution. In the bottom-light type device where the center principal ray of the illumination light to enter the reflection type image forming device is on the same plane as the center principal ray of the projection light from the image forming device to the screen, off light advances towards the projection optical system similarly to the projection light. For this reason, the off light easily enters the projection optical system. The constitution relating to the handling of the off light, however, is not proposed for such a projection type image display apparatus.

SUMMARY OF THE INVENTION

It is an object of the present invention to prevent off light from entering a projection optical system with an easy constitution in a projection type image display apparatus having a reflection type image forming device. Particularly it is an object of the present invention to prevent off light from entering the projection optical system with easy constitution in a projection type image display apparatus of bottom-light type.

According to a first aspect of the present invention, a projection type image display apparatus includes: an illumination optical system generating an illumination light; a projection optical system projecting an image light onto a screen; a reflection type image forming device modulating the illumination light so as to form the image light, the reflection type image forming device having an image forming surface on which a plurality of micromirrors are arranged two-dimensionally, a rotational angle of the micromirrors being set to at least one of first and second angles according to a picture signal input into the reflection type image forming device, each of the micromirrors reflecting the illumination light in a first direction where the light is led to the screen via the projection optical system at the first angle and reflecting the illumination light in a second direction where the light is not led to the screen at the second angle; and a reflection mirror arranged in a position opposite to an optical path of the illumination light to enter the reflection type image forming device across an optical path of the projection light reflected in the first direction by the micromirrors at the first angle, the reflection mirror reflecting the light reflected in the second direction by the micromirror at the second angle in a direction separated from the projection light.

Light which is reflected in the second direction from the micromirror set at the second angle and is not led to the screen (so-called off light) is reflected in the direction separated from the projection light reflected by the micromirror set at the first angle. For this reason, the off light (unnecessary light) can be prevented from entering the projection optical system.

According to a second aspect of the present invention, an projection type image display apparatus includes: a projection optical system projecting an image light onto a screen; an optical component holding member holding at least one optical component of the projection optical system; a reflection type image forming device separating an illumination light into the image light to be projected onto the screen and the other unnecessary light according to an input signal thereto; and a reflection element for reflecting the unnecessary light arranged in a space between the reflection type image forming device and the projection optical system.

According to a third aspect of the present invention, an projection type image display apparatus includes: a projection optical system projecting an image light onto a screen; an optical component holding member holding at least one optical component of the projection optical system; a digital micromirror device separating illumination light into the image light to be projected onto the screen and the other unnecessary light according to an input signal thereto; and a reflection mirror arranged in a space between the digital micromirror device and the projection optical system, and reflecting the unnecessary light in a direction which crosses an optical path of the image light.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENT

Embodiments of the present invention are explained below with reference to the drawings.

First Embodiment

Figure 1:
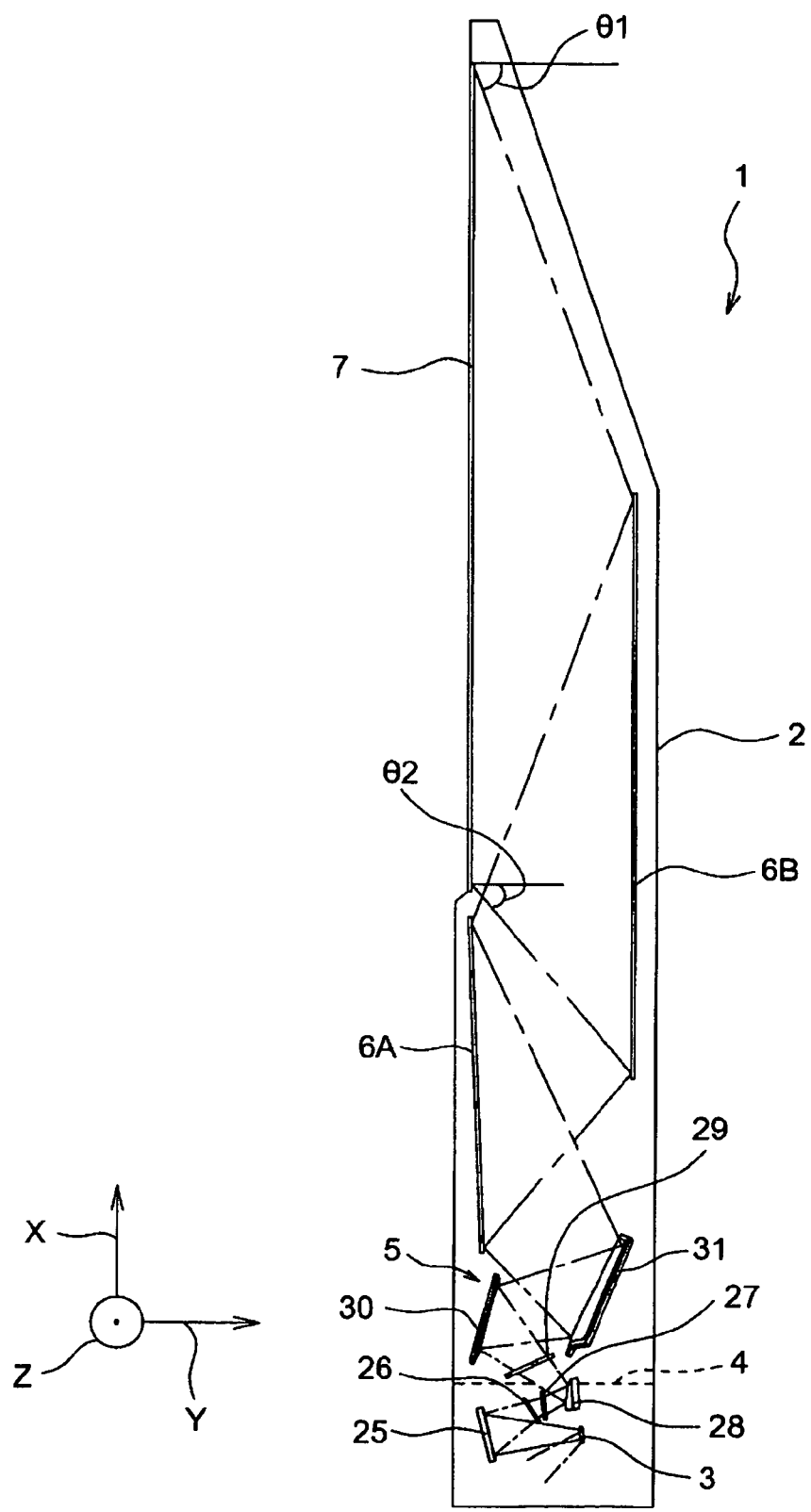
FIG. 1 is a schematic diagram illustrating a rear-projection television according to an embodiment of the present invention.

FIG. 1 illustrates a rear-projection television 1 according to a first embodiment of a projection type image display apparatus of the present invention (also referred to herein as a projection image display apparatus). A casing 2 of the rear-projection television 1 houses a digital micromirror device (DMD) 3 as one example of a reflection type image forming device (also referred to herein as a reflective image forming device), an illumination optical system 4 that emits illumination light to the DMD 3, and a projection optical system 5 that enlarges and projects projection light modulated by the DMD 3, namely, image light. Further, a screen 7 onto which an image enlarged by the projection optical system 5 is projected via two plane mirrors 6A and 6B is disposed on a front upper surface of the casing 2.

Figure 2:
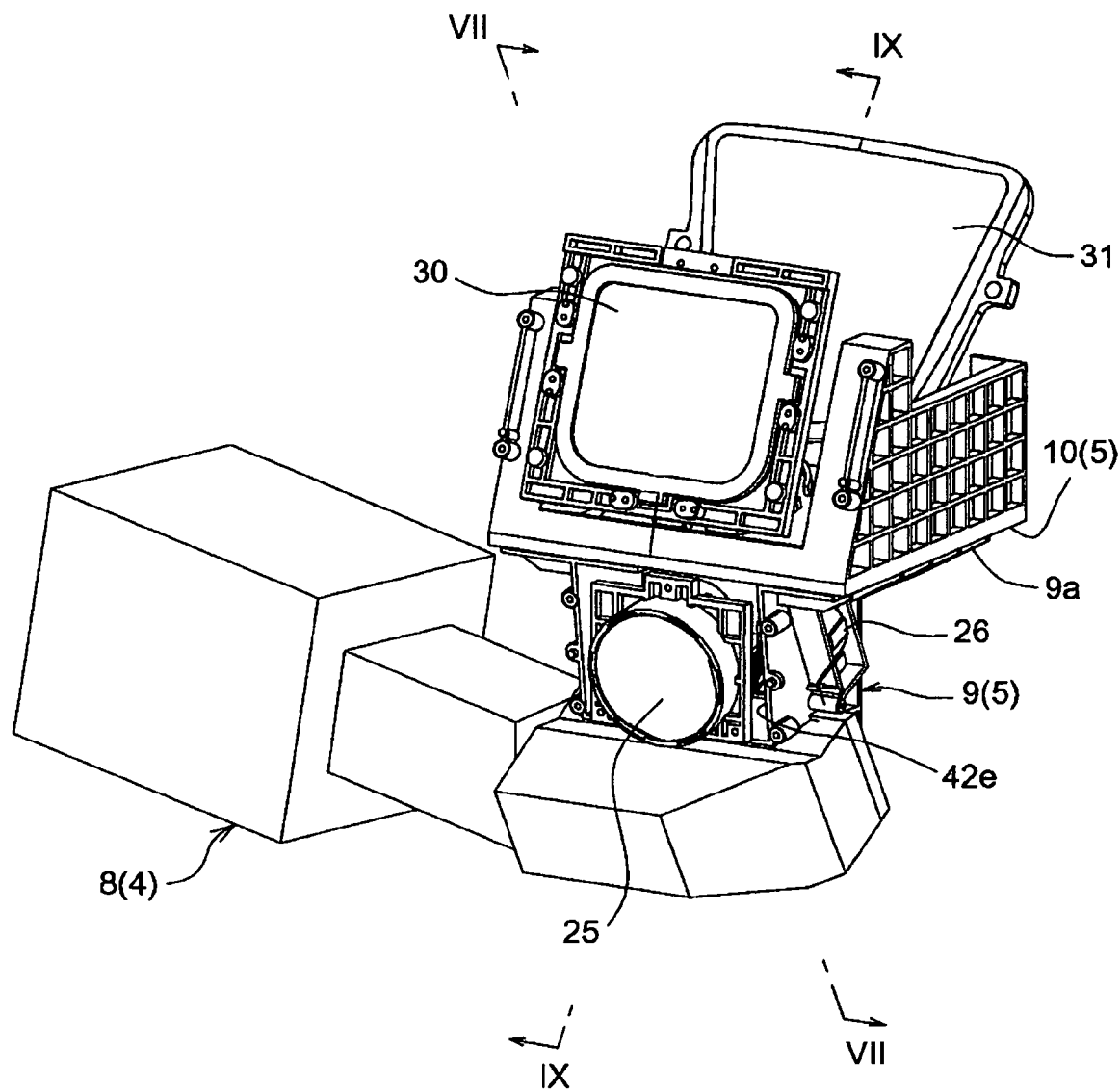
FIG. 2 is a perspective view illustrating an outline of an illumination optical system and a projection optical system according to the embodiment of the present invention.
Figure 3:
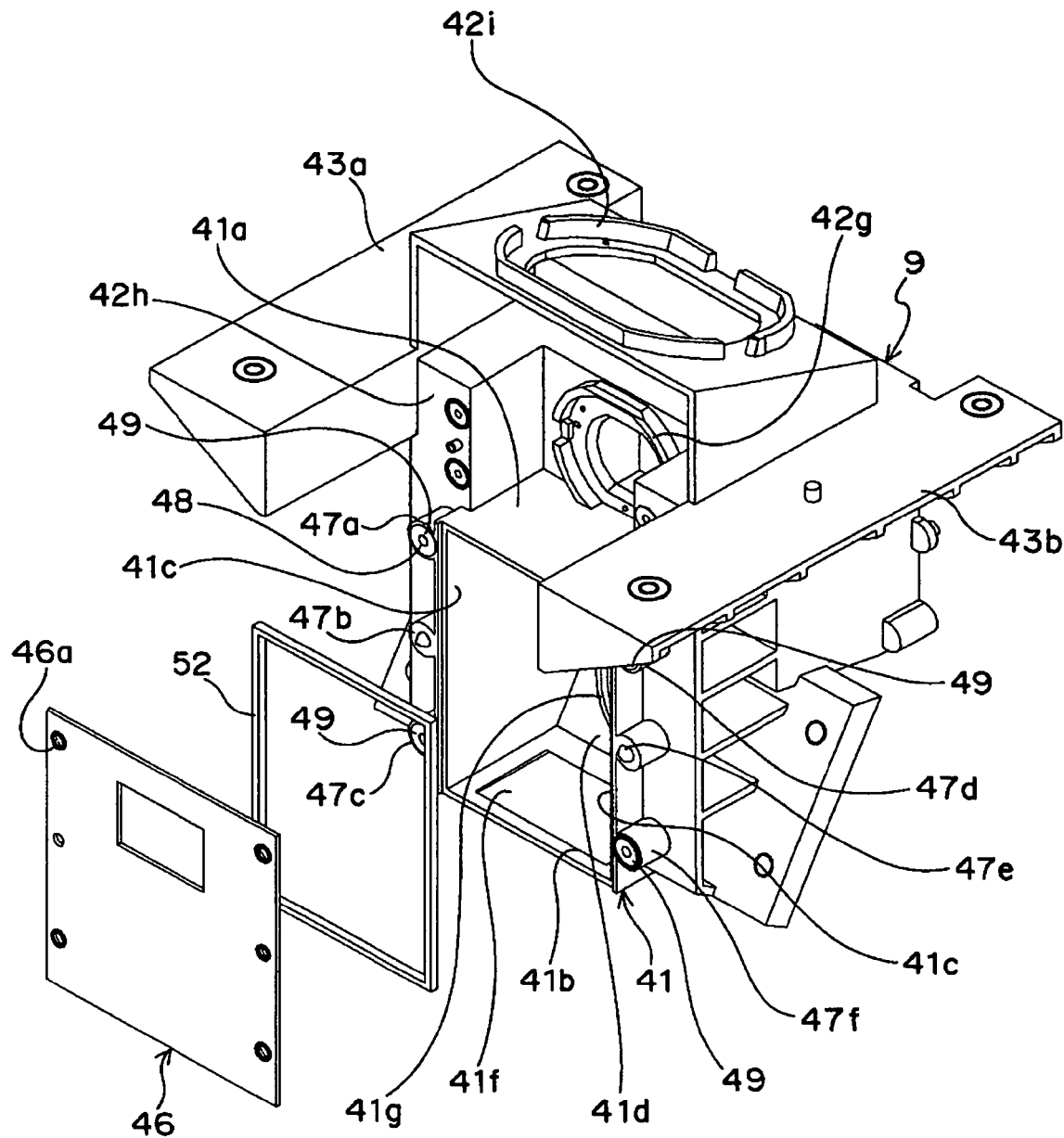
FIG. 3 is an exploded perspective view of a lower optical component holding member.

With respect also to FIG. 2, in addition to an illumination case 8 that houses the illumination optical system 4, a lower optical component holding member 9 and an upper optical component holding member 10 are housed in a lower part of the casing 2. As mentioned later, the lower and upper optical component holding members 9 and 10 hold the DMD 3 and optical parts of the projection optical system 5. With reference also to FIG. 3, the lower optical component holding member 9 has a pair of seats 43a and 43b on its upper outside portion 9a. The upper optical component holding member 10 is placed on the seats 43a and 43b.

(DMD)

Figure 4:
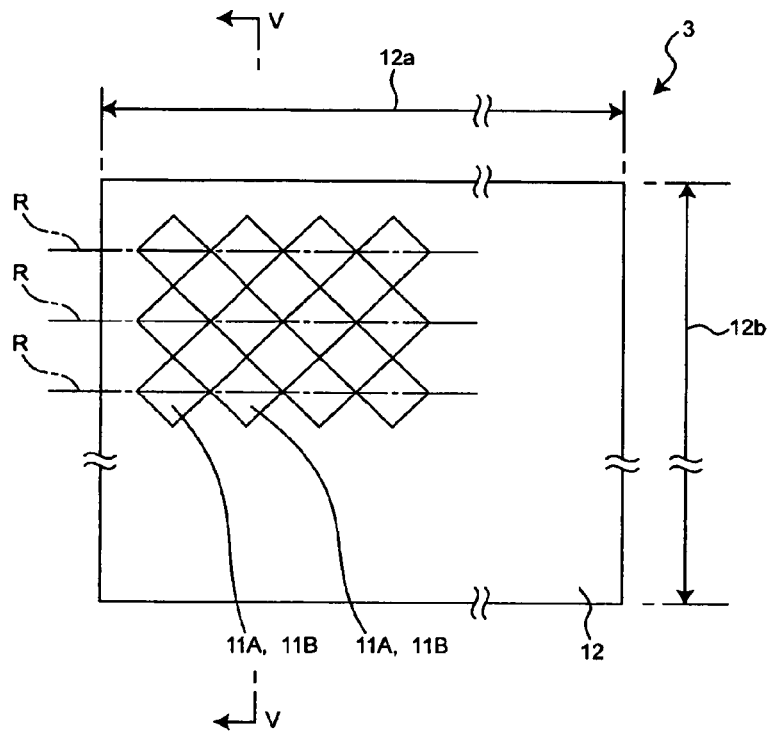
FIG. 4 is a schematic diagram illustrating a mirror plane of a DMD.
Figure 5:
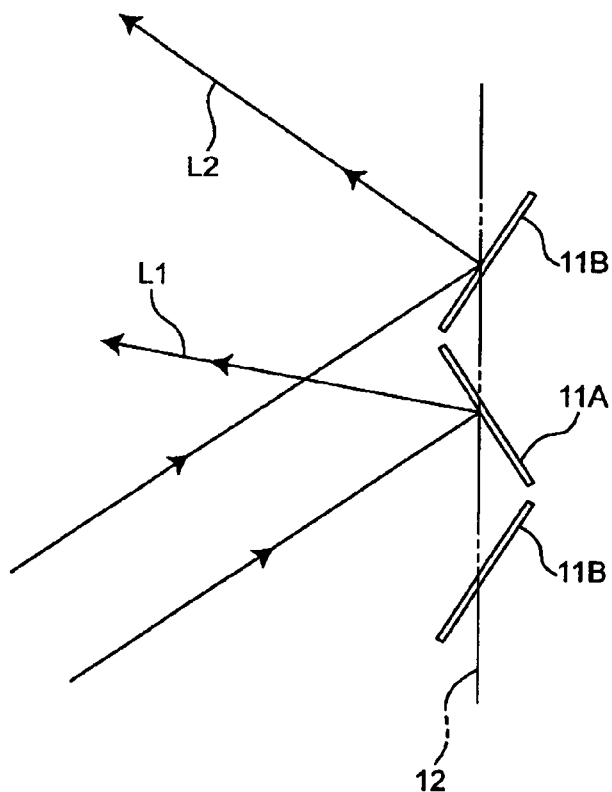
FIG. 5 is a schematic sectional view taken along line V-V of FIG. 4.

The DMD 3 is an image forming device that spacially modulates entering light according to a reflecting direction. With reference to FIGS. 4 and 5, the DMD 3 has a mirror plane (image forming surface) 12 which is composed so that a lot of minute micromirrors 11A and 11B are arranged two-dimensionally. Rotational angles of the individual micromirrors 11A and 11B can be switched between two kinds of angles according to an input picture signal. The micromirror 11A which is set to one angle is in an "ON" state. The micromirror 11A in the ON state reflects the illumination light from the illumination optical system 4 in a direction led from the projection optical system 5 to the screen 7 (projection light). Concretely, the projection light is projected onto the screen 7 via the projection optical system 5 and the plane mirrors 6A and 6B. On the other hand, the mirror 11B which is set to the other rotational angle of the two angles is in an "OFF" state. The micromirror 11B in the OFF state reflects the illumination light from the illumination optical system 4 in a direction which is not led to the projection optical system 5 and the screen 7. A reference symbol L1 designates the projection light reflected by the mirror 11A in the ON state, and a reference symbol L2 designates off light (unnecessary light) reflected by the mirror 11B in the OFF state. The mirror plane 12 has a rectangular shape having a long side 12a and a short side 12b, and the rotational axes R of the micromirrors 11A and 11B are parallel with the long side 12a of the mirror plane 12.

(Illumination Optical System)

Figure 6:
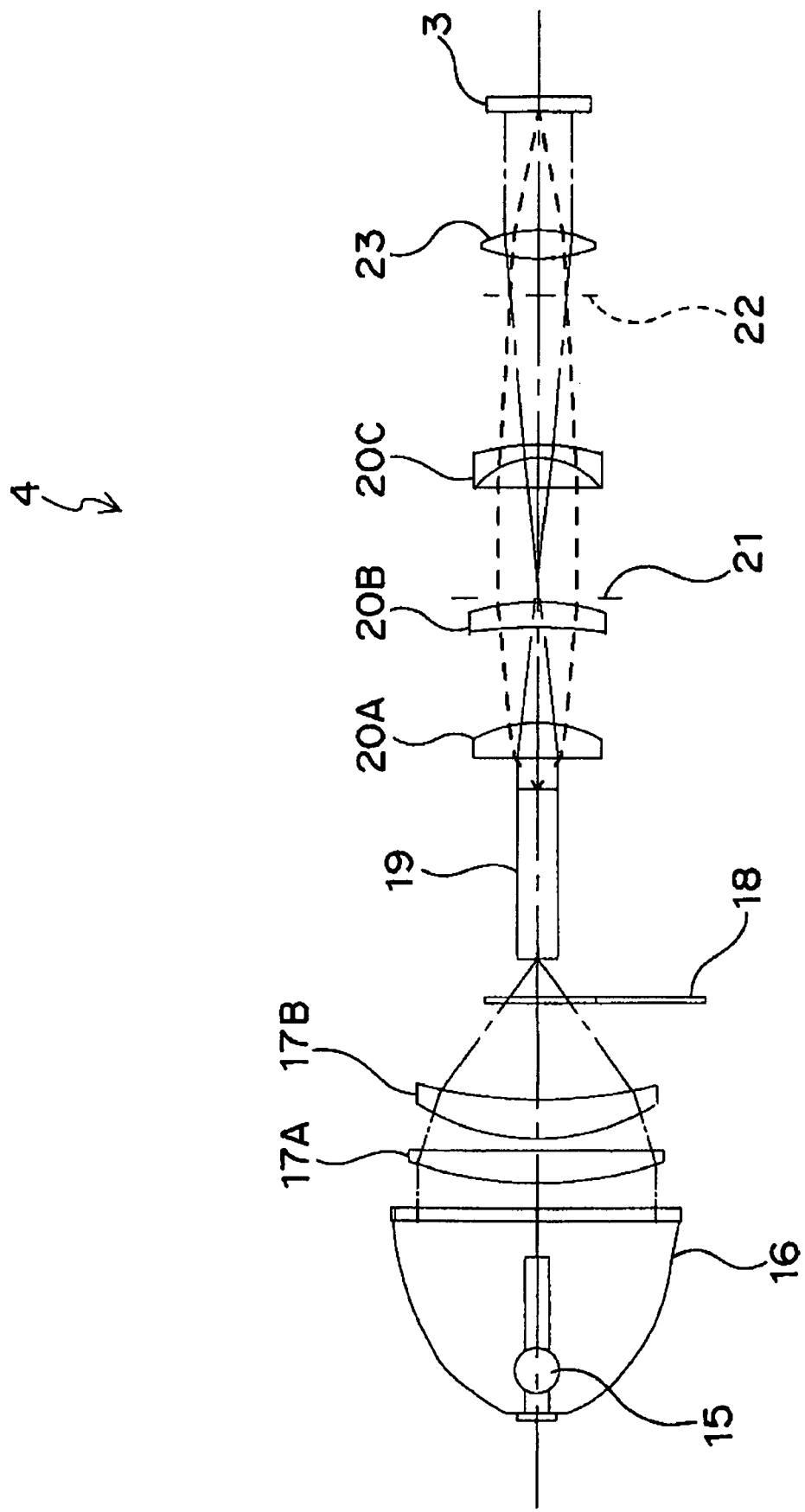
FIG. 6 is a constitutional diagram of an illumination optical system.
Figure 7:
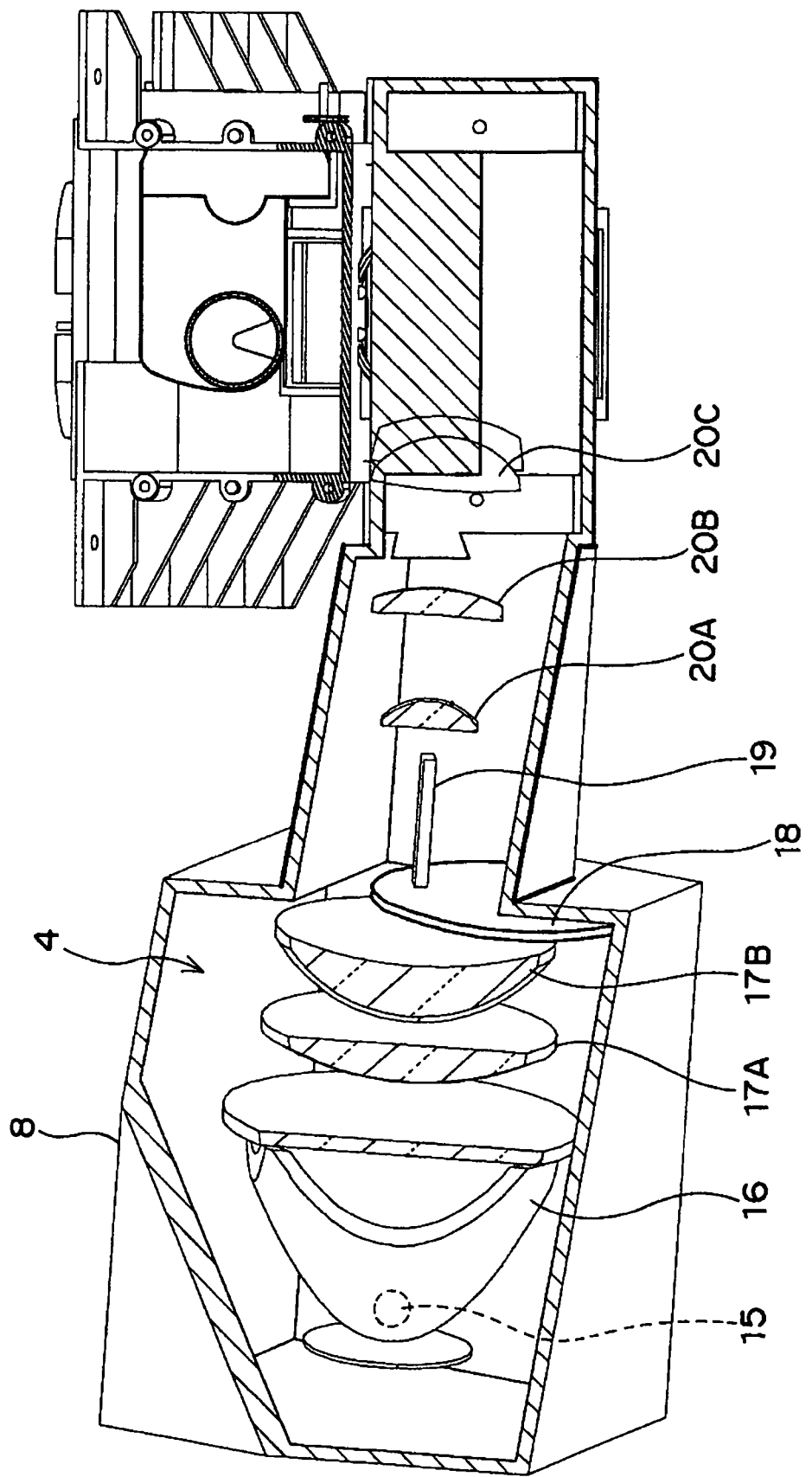
FIG. 7 is a sectional view taken along line VII-VII in FIG. 2.

With reference to FIGS. 6 and 7, the illumination optical system 4 has a discharge lamp 15 composed of, for example, an ultra high pressure mercury lamp, a parabolic mirror 16, condenser lenses 17A and 17B, a color wheel 18, an integrator rod 19, relay lenses 20A, 20B and 20C, a diaphragm 21, a mirror 22 and an entrance lens 23. A thick broken line in FIG. 6 designates an imaging relationship.

Light emitted from the discharge lamp 15 is converted into parallel light by the parabolic mirror 16, and is condensed to an incident surface of the integrator rod 19 by the condenser lenses 17A and 17B. Color filters 18 that transmit color light beams of red, blue and green are arranged on a periphery of the color wheel 18 arranged in a vicinity of the incident surface of the integrator rod 19. When the color wheel 18 rotates, the incident light to the integrator rod 19 is separated into color light beams according to time division. The integrator rod 19 is a glass rod of rectangular solid, and totally reflects and overlap incident light in the inner surface of the rod, so as to emit light flux having uniform intensity distribution from an emission surface. The integrator rod 19 may be a hollow rod having a reflection surface in its inner surface. The relay lenses 20A to 20C, the diaphragm 21, the mirror 22 and the entrance lens 23 form an image of the emission surface of the integrator rod 19 onto the mirror plane 12 of the DMD 3. As a result, the mirror plane 12 of the DMD 3 is illuminated with uniform light intensity.

The mirror 22 which is arranged between the relay lenses 20A to 20C and the entrance lens 23 bends an optical path of the illumination light diagonally upward right from a direction towards a front side in FIG. 1. For this reason, as shown in FIGS. 9 and 10 the most clearly, the illumination light from the illumination optical system 4 is emitted from a lower side to the DMD 3.

Figure 8:
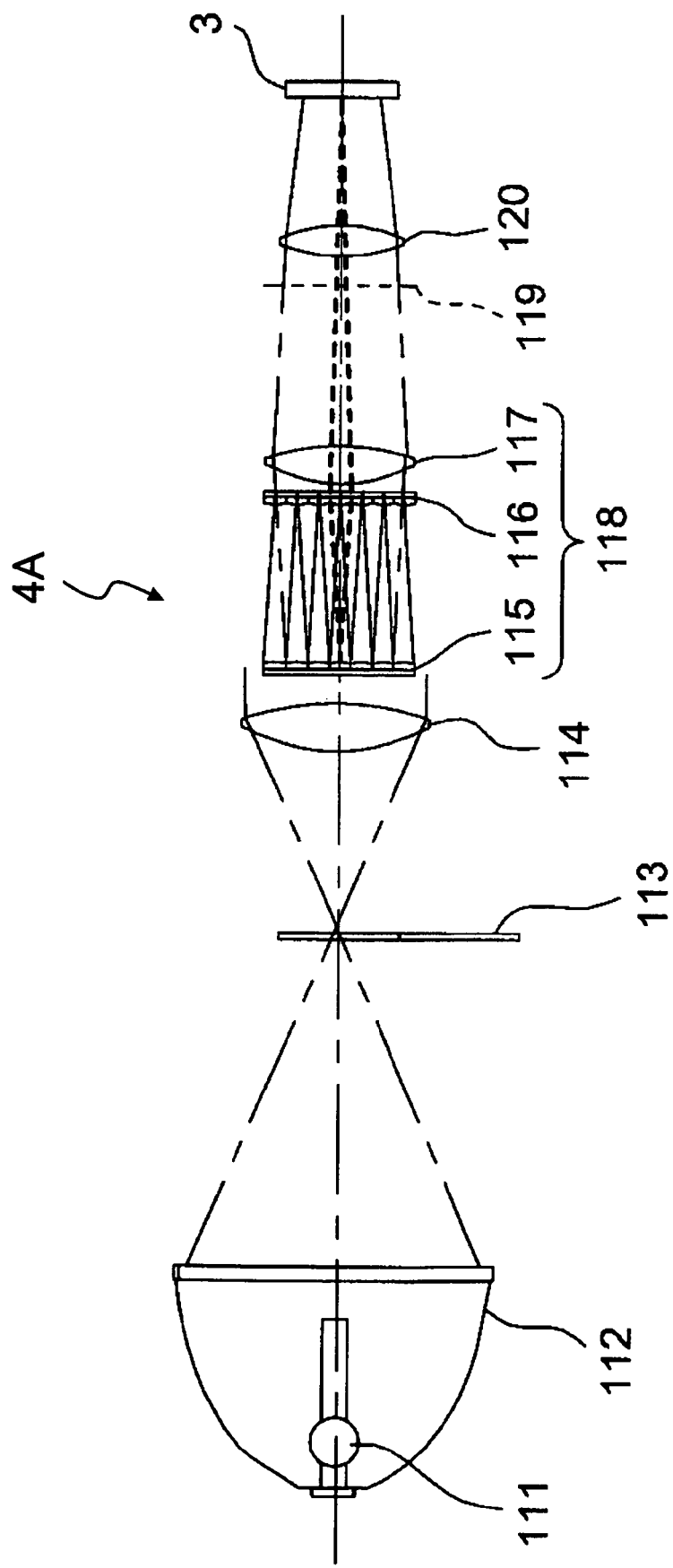
FIG. 8 is a constitutional diagram of an alternative idea of the illumination optical system.

FIG. 8 illustrates another embodiment of the illumination optical system. The illumination optical system 4A has a discharge lamp 111, an oval mirror 112, a color wheel 113, a collimating lens 114, a lens array type integrator optical system 118 composed of two lens arrays 115 and 116 and a convex lens 117, a mirror 129, and an entrance lens 120. Light emitted from the discharge lamp 111 is condensed by the oval mirror 112. The color wheel 113 is disposed on the condensing position. The light diverged after the condensing is converted into parallel light by the collimating lens 114, so as to enter the integrator optical system 118. The two lens array plates 115 and 116 of the integrator optical system 118 are constituted so that lens cells having a shape similar to that of the mirror plane 12 of the DMD 3 (rectangular shape) are arranged two-dimensionally. The respective lens cells of the lens array plate 115 condense parallel light flux from the collimating lens to the lens array plate 116. The second lens array plate 116, the convex lens 117 and the entrance lens 120 form an image of the lens cells shape (rectangular shape) of the first lens array plate 115 onto the mirror plane 12 of the DMD 3. The convex lens 117 has a function for superimposing the light flux condensed by the lens cells onto the mirror plane 12 of the DMD 3. As a result, the DMD 3 is illuminated with the light flux having uniform light intensity. The mirror 119 bends an optical path of the illumination light diagonally upward right from the direction toward the front side in FIG. 1. And the illumination light illuminates the DMD 3 from a lower side.

Figure 9:
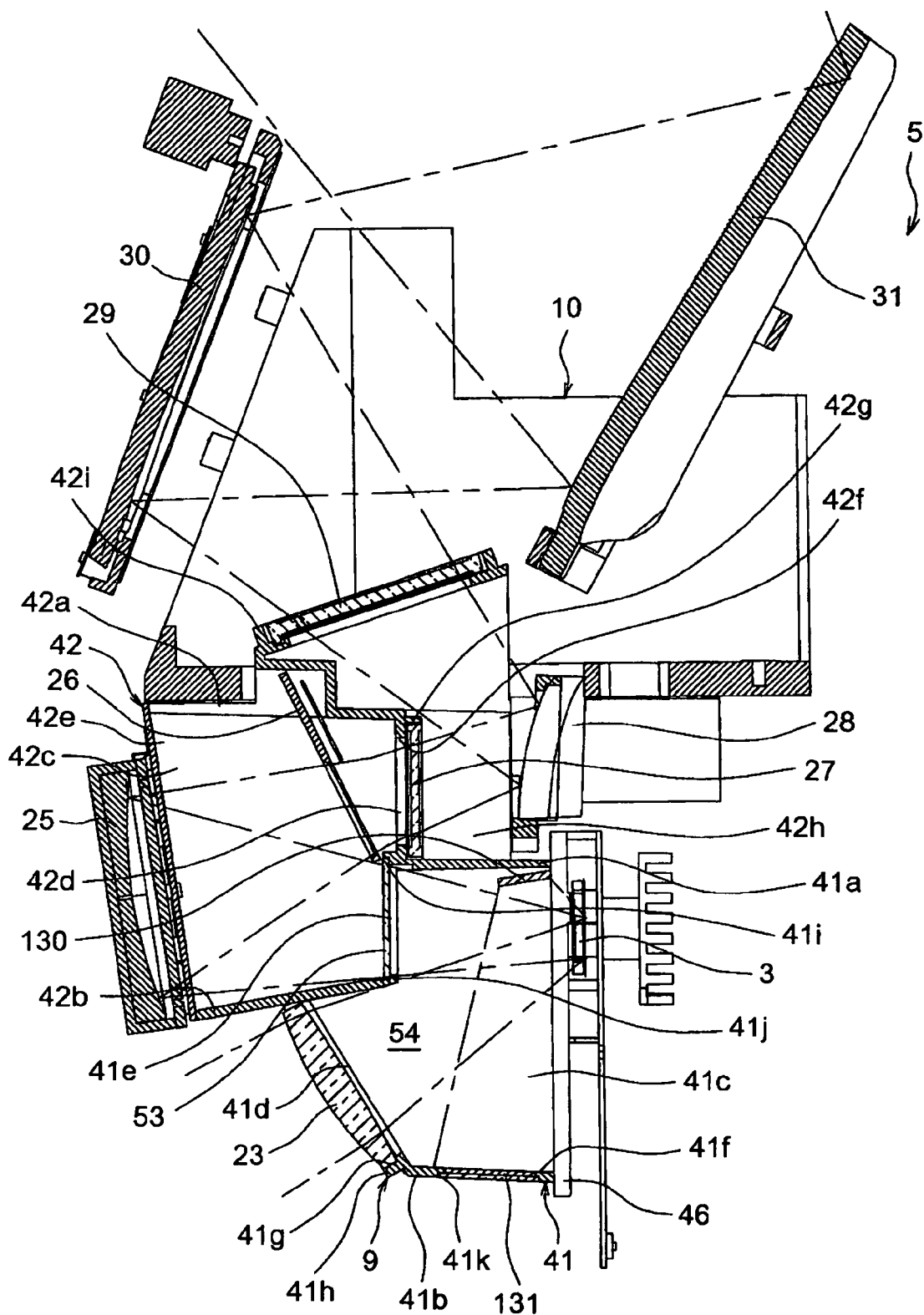
FIG. 9 is a sectional view taken along line IX-IX in FIG. 2.
Figure 10:
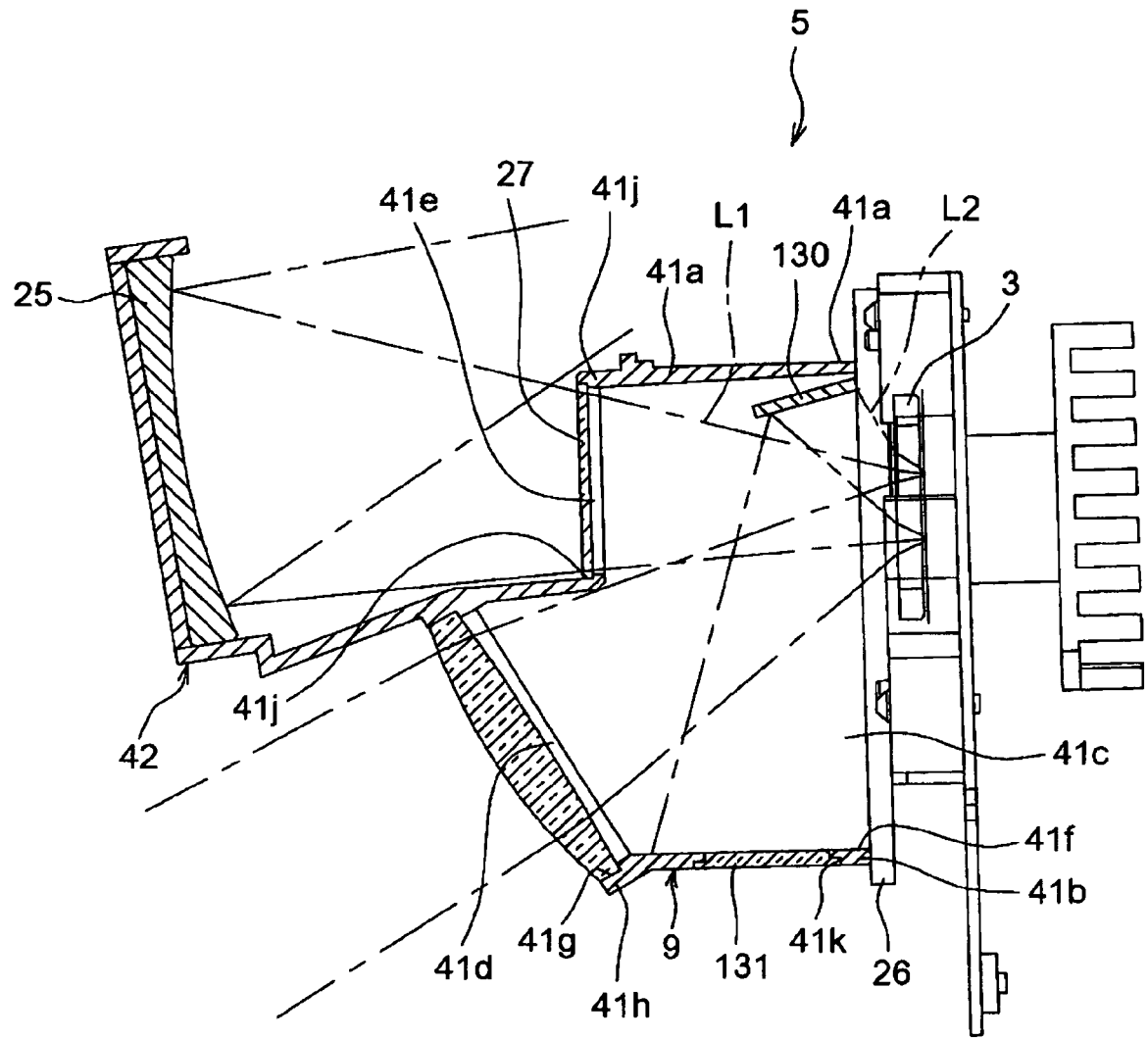
FIG. 10 is a partially enlarged diagram of FIG. 7.

In FIGS. 6 and 8, and FIGS. 13 to 17 mentioned later, the DMD 3 is drawn perpendicularly to the optical axis of the illumination optical system for descriptive purposes, but as shown in FIG. 9, the DMD actually tilts with respect to the optical axis of the illumination optical system.

(Projection Optical System)

With reference to FIGS. 1, 9 and 10, the projection optical system 5 has four curved mirrors 25, 28, 30 and 31, two aberration correcting plates 27 and 29, and one variable diaphragm mechanism 26. Concretely, the concave mirror 25, the variable diaphragm mechanism 26, the first aberration correcting plate 27, the convex mirror 28, the second aberration correcting plate 29, the first free curved mirror 30, and the second free curved mirror 31 are arranged in this order from the side of the DMD 3. The concave mirror 25 has spherical surface, and the convex mirror 28 has rotationally symmetrical aspherical surface. The concave mirror 25, the variable diaphragm mechanism 26, the first aberration correcting plate 27 and the convex mirror 28 in the optical parts of the projection optical system 5 are held by the lower optical component holding member 9, and the first and second free curved mirrors 30 and 31 are held by the upper optical component holding member 10. The aberration correcting plate is a refractive optical parts which does not substantially have an optical power, and has a role in correcting aberration generated in the curved mirrors.

The concave mirror 25 is arranged so as to be opposed to the DMD 3. The convex mirror 28 is arranged slightly above the concave mirror 25 in an opposed manner. Similarly, the first free curved mirror 30 is arranged slightly above the convex mirror 28 in an opposed manner, and also the second free curved mirror 31 is arranged slightly above the first free curved mirror 30 in an opposed manner. The light flux from the DMD 3, therefore, is reflected by the concave mirror 25, the convex mirror 28, the first free curved mirror 30, and the second free curved mirror 31 so as to be bent and go upward, and is emitted to the first plane mirror 6A.

The rear projection television 1 in this embodiment is of a bottom-light type in which the illumination light from the illumination optical system 4 is emitted from below with respect to the mirror plane 12 of the DMD 3. A center principal ray of the illumination light on the optical path from the mirrors 22 (119) via the entrance lenses 23 (120) to the DMD 3, a center principal ray of the projection light from the DMD 3 and a center principal ray of the off light are in the same plane (a plane parallel with an XY plane in FIG. 1). Center principal ray means a principal ray of light beam to/from a center of the mirror plane 12 of the DMD 3. The rear projection television 1 having such a constitution can project an image onto the large-scale screen 7 with a comparatively simple and inexpensive constitution, but as shown in FIG. 9 the most clearly, since off light (unnecessary light) goes upward, namely, towards the projection optical system 5 similarly to the projection light, the off light easily enters the projection optical system 5.

With reference to FIGS. 3, 9 and 10, the lower optical component holding member 9 and the optical parts held by it are explained in detail below. The lower optical component holding member 9 has first and second tube portions 41 and 42 which extend in a horizontal direction entirely. The second tube portion 42 is formed so as to be connected to the first tube portion 41, and is in a position on an upper left side in FIG. 9 with respect to the first tube portion 41. The first tube portion 41 has a top wall 41a, a bottom wall 41b, a pair of side walls 41c opposed to each other, a lower end wall 41d which closes a lower portion of one end (left side in FIG. 9), and an upper end wall 41e which closes an upper portion of one end. An opening 41f is formed on the other end (right side in FIG. 9).

The second tube portion 42 has a top wall 42a, a bottom wall 42b, a pair of side walls 42c opposed to each other, and an end wall 42d which closes an upper portion of one end (right side in FIG. 9). An opening 42e is formed on the other end (left side in FIG. 9). Further, the seats 43a and 43b are provided to the outside of the second tube portion 42. The bottom wall 42b of the second tube portion 42 slightly projects to an inside of the first tube portion 41, and the lower end wall 41d of the first tube portion 41 is provided below the bottom wall 42b, and the upper end wall 41e of the first tube portion 41 is provided above the bottom wall 42b. On the other hand, the top wall 41a of the first tube portion 41 extends to the end wall 42d of the second tube portion 42.

The opening 41f of the first tube portion 41 positioned on the right in FIGS. 9 and 10 (front side in FIG. 3) is closed in a sealed state by the image forming device holding plate 46 which holds the DMD 3. The DMD 3 is not shown in FIG. 3.

A mounting constitution of the image forming device holding plate (image forming device holder) 46 with respect to the first tube portion 41 is explained below. Totally four screw stoppers 47*a*, 47*c*, 47*d* and 47*f* (each two of them are on the right and left sides), and two locating bosses 47*b* and 47*e* (each is on the right and left sides) are provided to a vicinity of the opening 41*f* of the first tube portion 41, and the respective screw stoppers 47*a*, 47*c*, 47*d* and 47*f* are formed with an internal thread portion 48. Further, a contact surface 49 is formed at forward ends of the four screw stoppers 47*a*, 47*c*, 47*d* and 47*f* corresponding to four corners of the opening 41*f*. Four through holes 46*a* are formed in positions corresponding to the internal thread portions 48 of the screw stoppers 47*a*, 47*c*, 47*d* and 47*f* in the image forming device holding plate 46. Through holes are formed in positions corresponding to the locating bosses 47*b* and 47*e* in the image forming device holding plate 46. When screws 51 which are inserted into the through holes 46*a* are screwed into the screw stoppers 47*a*, 47*c*, 47*d* and 47*f*, the image forming device holding plate 46 is fixed to the first tube portion 41. The vicinities of the four corners of the image forming device holding plate 46 come in contact with the four contact surfaces 49, respectively, and thus the image forming device holding plate 46 is held to the first tube portion 41 in predetermined position and posture. Further, a rectangular elastic member 52 is inserted between the image forming device holding plate 46 and the peripheral edge of the opening 41*f* in a compressed state.

An opening 41*g* is formed also on the lower end wall 41*d* of the first tube portion 41 positioned on the left side (inner side in FIG. 3) in FIGS. 9 and 10. The entrance lens 23 of the illumination optical system 4 is mounted to a lens holding portion 41*h* formed on the peripheral edge of this opening 41*g*. The opening 41*g* of the lower end wall 41*d* is closed in a sealed state by the entrance lens 23.

An opening 41*i* for connecting the inside of the first tube portion 41 and the inside of the second tube portion 42 is formed on the upper end wall 41*e* of the first tube portion 41 positioned on the left side (inner side in FIG. 3) in FIGS. 9 and 10. The optical path from the DMD 3 to the concave mirror 25 as the first optical part of the projection optical system 5 passes through the opening 41*i*. A cover glass 53 composed of a flat plate glass is mounted to a cover holding portion 41*j* formed on the peripheral edge of the opening 41*i*. The opening 41*i* of the upper end wall 41*e* is closed by the cover glass 53.

A reflection mirror 130 is disposed on a vicinity of the top wall 41*a* in the first tube portion 41, concretely, an opposite side to the optical path of the illumination light entering the DMD 3 across the optical path of the projection light L1 reflected by the micromirror 11A in the ON state. The reflection mirror 130 reflects off light L2 reflected by the micromirror 11B in the OFF state. In this embodiment, the reflection mirror 130 is a plane mirror.

An opening 41*k* is formed in a position of the first tube portion 41 opposed to the reflection mirror 130, concretely, on the bottom wall 41*b* of the first tube portion 41, and the opening 41*k* is closed by a plane glass 131 in a sealed state.

The inside of the first tube portion 41 having the above constitution is a sealed space 54 which is surrounded by the image forming device holding plate 46, the elastic member 52, the entrance lens 23 of the illumination optical system 4, the cover glass 53 and the plane glass 131 as well as the top wall 41*a*, the bottom wall 41*b*, the side walls 41*c*, the lower end wall 41*d* and the upper end wall 41*e* of the first tube portion 41. In other words, the mirror plane 12 of the DMD 3, a final portion of the optical path from the illumination optical system 4 to the mirror plane 12, and a first portion of the optical path from the DMD 3 to the concave mirror 25 as the first optical part of the projection optical system 5, and the reflection mirror 131 are in the inside of the sealed space 54.

When the surrounding area of the DMD 3 is made to be the sealed space 54, adhesion of dust and dirt into the DMD 3 which causes deterioration in the image quality can be prevented.

A clean degree of the sealed space 54 is preferably set within a range of higher than class 5000 to lower than class 100. The clean degree is based on Fed-Std-209D (American Federal Standard 209D), and it is an upper limit value of a particle number in 1 CF (cubic feet) (about 28.3 litter) with respect to 0.5 μm. When the clean degree of the sealed space 54 is class 5000 or less, the image quality is remarkably deteriorated due to an image of dust and dirt projected onto the enlarged and projected image. On the other hand, a very expensive facility is required for setting the clean degree of the sealed space 54 to class 100 or more, but even if the clean degree is less than class 100, the deterioration in image quality which becomes a practical problem caused by dust and dirt does not occur as long as the clean degree is more than class 5000.

The off light L2 reflected by the mirror 11B in the OFF state is reflected by the reflection mirror 130 in a direction which is separated from the projection light reflected by the micromirror 11A in the ON state, namely, downward in FIGS. 9 and 10. In other words, the off light L2 is reflected by the plane mirror 131 so as to be led in a direction different from that of the projection light L1. The off light L2 can be, therefore, prevented from entering the projection optical system 5. As a result, heat generation in the projection optical system 5 due to illuminating of the optical parts and the optical component holding members composing the projection optical system 5 with the off light L2 can be suppressed. Further, since the off light L2 which enters the projection optical system 5 can be prevented from becoming harmful light imaged on the screen 7, deterioration in image quality such as deterioration in contrast due to the harmful light can be prevented.

The off light L2 reflected by the reflection mirror 130 is not simply separated from the projection light L1 but transmits through the plane glass 131 and is led to the outside of the first tube portion 41 (lower optical component holding member 9). The mirror plane 12 of the DMD 3 and the plane glass 131 are arranged in the sealed space 54 in the first tube portion 9. When, therefore, the off light L2 reflected by the reflection mirror 130 is led from the sealed space 54 to the outside, heat generation in the first tube portion 41 can be prevented. Further, since the opening 41*k* of the first tube portion 41 is closed in a sealed state by the plane glass 131, the off light L2 can be led to the outside of the first tube portion 41 without deteriorating the sealing property of the sealed space 54 for preventing intrusion of dust and dirt.

The concave mirror 25 is mounted to the opening 42*e* of the second tube portion 42. The variable diaphragm mechanism 26 is disposed in the second tube portion 42. The opening 42*f* is formed also on the end wall 42*d* of the second tube portion 42, and the first aberration correcting plate 27 is mounted to a holding portion 42*g* formed on the peripheral edge of the opening 42*f*. Further, the convex mirror 28 is mounted to a mirror holding portion 42*h* formed on an outer side with respect to the holding portion 42*g*. The second aberration correcting plate 29 is mounted to a holding portion 42*i* formed on an upper outside of the second tube portion 42. The first and second free curved mirrors 30 and 31 are mounted to the upper optical component holding member 10.

The rear projection television 1 according to the first embodiment is of the bottom-light type in which the center principal rays of the illumination light and the projection light L1 and the off light L2 are in the same plane. In such a constitution, the off light L2 advances upward similarly to the projection light L1. In this case, the off light L2 is reflected by the reflection mirror 130 and is led from the plane glass 131 to the outside of the lower optical component holding member 9, so that the off light L2 can be prevented from entering the projection optical system 5. As a result, the heat generation in the projection optical system 5 due to the off light L2 is suppressed, and thus the deterioration in image quality due to imaging of the off light L2 on the screen 7 via the projection optical system 5 can be prevented.

Second Embodiment

Figure 11:
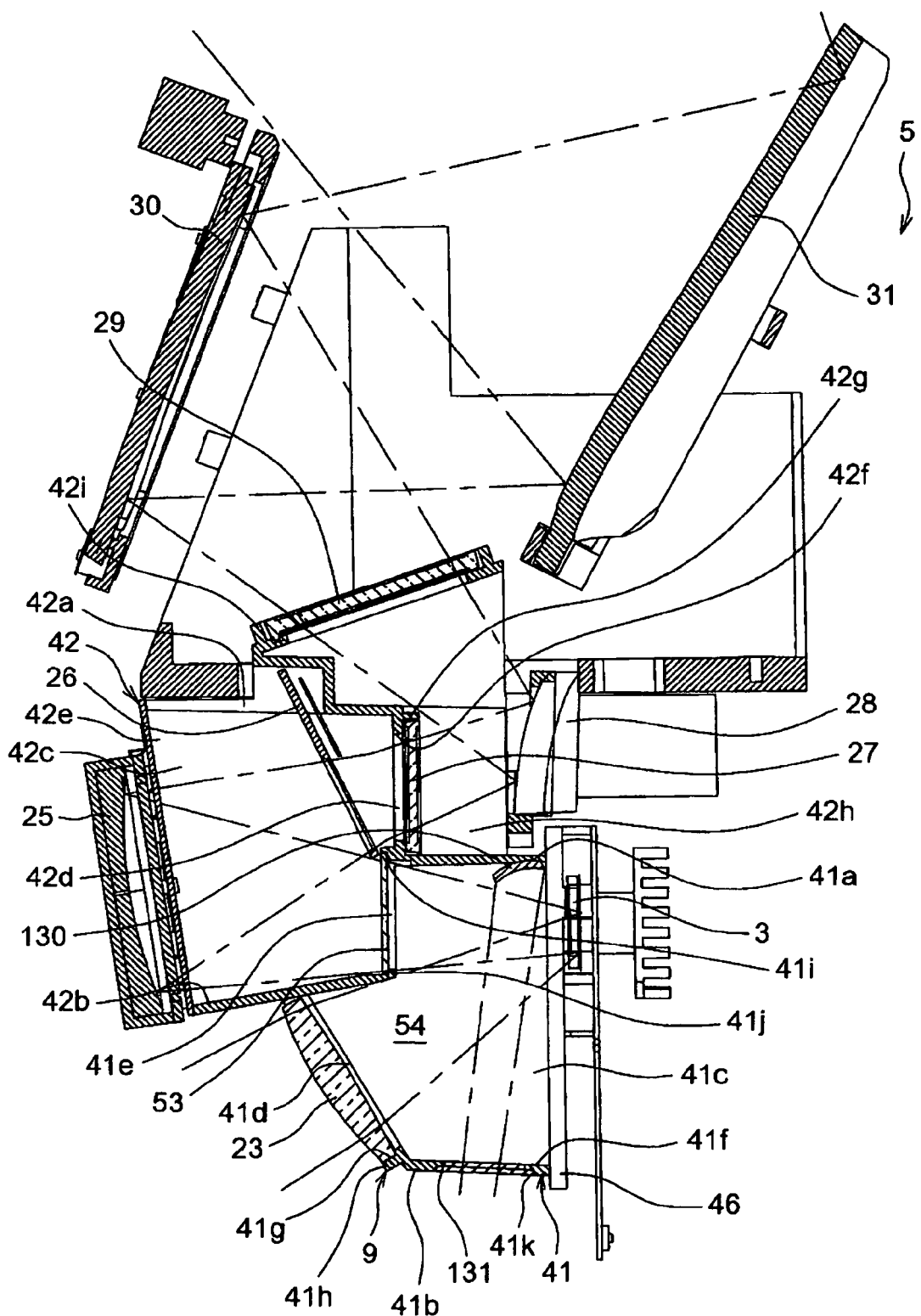
FIG. 11 is a partially sectional view of the rear-projection television according to a second embodiment of the present invention.
Figure 12:
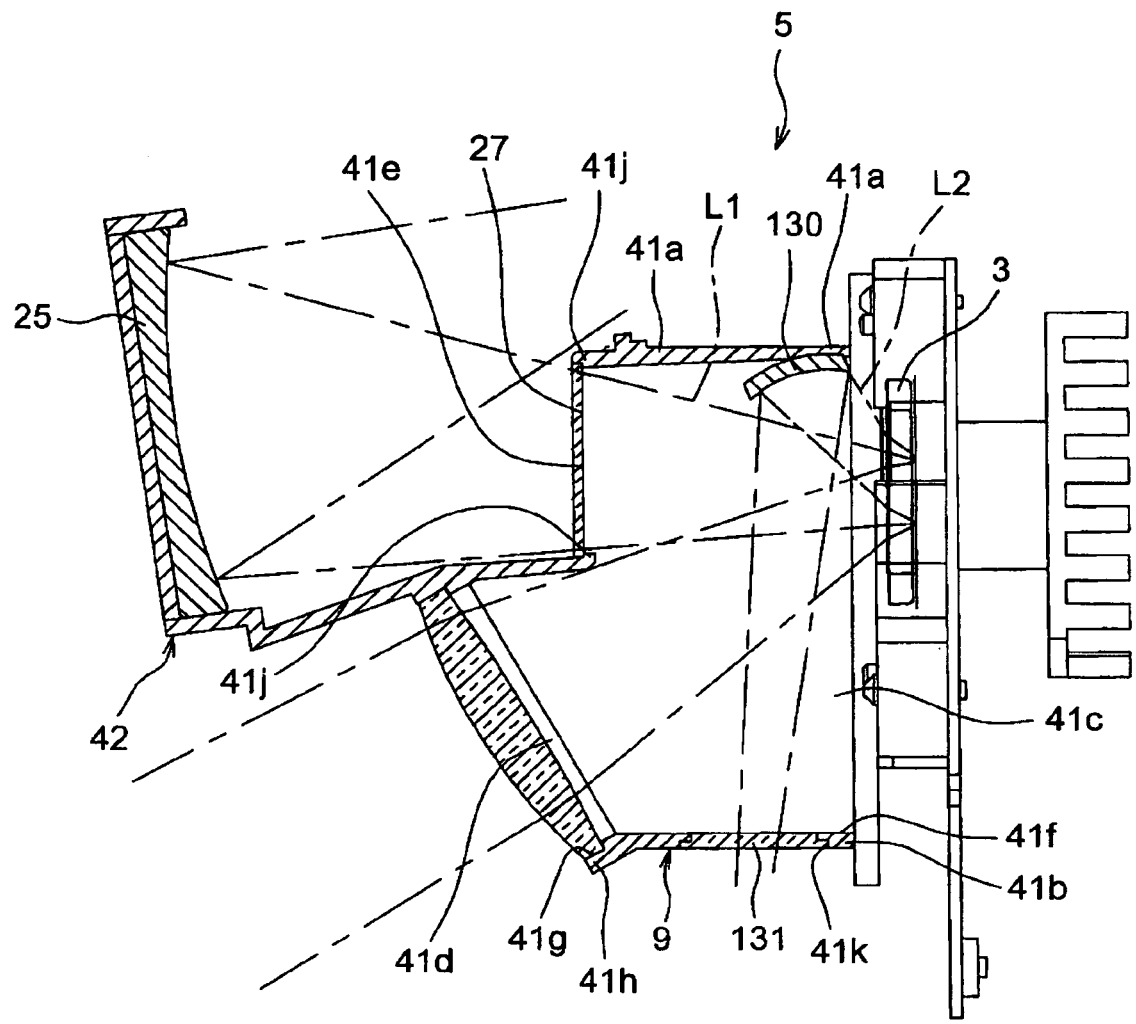
FIG. 12 is a partially enlarged diagram of FIG. 11.

A second embodiment of the present invention shown in FIGS. 11 and 12 is different from the first embodiment in that the reflection mirror 130A is not a plane mirror but a concave mirror having condensing curved shape. When the reflection mirror is the curved mirror 130A, the diameter of the light flux of the off light L2 reflected by the reflection mirror can be smaller than the case of the plane mirror. As a result, the off light L2 can be prevented from entering the projection optical system 5 more securely, and thus the deterioration in image quality due to heat generation in the projection optical system 5 and imaging of the off light L2 on the screen 7 can be prevented more securely. Since the off light L2 reflected by the reflection mirror 130A becomes converged light flux, the entire light flux transmits through the plane glass 131 securely so as to be led to the outside of the first tube portion 41 (lower optical component holding member 9).

Since the other constitutions and functions in the second embodiment are similar to those in the first embodiment, like members are designated by like numerals and explanation thereof is not made.

A sealed structure where the image forming surface and the reflection mirror of the reflection type image forming device are sealed is provided and a transparent member is provided to a position of the sealed structure opposed to the reflection mirror. As a result, the intrusion of dust and dirt to the periphery of the reflection type image forming device which causes the deterioration in image quality is prevented, and the heat generation in the sealed structure due to the off light reflected by the reflection mirror can be prevented.

The present invention is not limited to the embodiments and can be modified variously. For example, the rear projection television as the rear-projection type image display apparatus is exemplified as the present invention, but the present invention can be applied also to a front-projection type image display apparatus that projects an image from a front side of a screen.

(Prevention of Uneven Illuminance in Up-Down Direction of the Screen)

With reference to FIG. 1, in the rear projection television 1 of the bottom-light type, the angle at which the projection light from the projection optical system 5 enters the screen 7 varies in the upper and lower parts of the screen. More concretely, the angle θ1 at which the projection light enters the upper part of the screen 7 is larger than the angle θ2 at which the projection light enters the lower part of the screen 7. Since reflectance due to the screen 7 generally increases as the incident angle is larger, when a difference between the incident angles θ1 and θ2 becomes large, the uneven illuminance such that the illuminance with respect to the upper part of the screen 7 becomes lower than the illuminance with respect to the lower part of the screen 7 occasionally occurs. The projection optical system 5 and the illumination optical system 4 of the rear projection television 1 in the embodiment are a telecentric system, but if they are not the telecentric system, the uneven illuminance occasionally occurs in such a manner that the illuminance of at least one of the upper part and the lower part of the screen 7 becomes lower than that of the other part.

In order to prevent or reduce the uneven illuminance of the screen 7 and thus improve the image quality of the screen, the following intensity distribution may be obtained. The intensity distribution is such that the illumination light which enters the mirror plane 12 of the DMD 3 from the illumination optical system 4 becomes more intense from at least one of the upper and lower sides of the mirror plane 12 to the other side according to the tendency such that the illuminance of the projection light becomes lower in at least one of the upper and lower parts of the screen 7. The constitution of the illumination optical system 4 where the uneven illuminance of the screen 7 is prevented or reduced is explained by exemplifying a case where the illuminance in the upper part of the screen 7 is lower than that in the lower part and the upper part of the mirror plane 12 of the DMD 3 corresponds to the upper part of the screen 7.

In general, an integrator optical system is used in order to obtain the uniform intensity distribution of the illumination light. In this case, the intensity distribution of the light flux to enter the integrator optical system should be symmetrical. Example where the integrator optical system is used is disclosed in U.S. Pat. Nos. 5,634,704 and 5,865,521.

In order to obtain such intensity distribution of the illumination light, the light flux which has intensity distribution asymmetrical with respect to the optical axis of the integrator optical system may be allowed to enter the integrator optical system. The integrator optical system divides light flux and overlaps the divided light flux each other so as to produce uniform distribution. If, however, the intensity distribution of light flux to be input is asymmetrical, uniform intensity distribution cannot be obtained. In illumination optical systems 400A, 400B, 400C and 400E in FIGS. 13, 14, 15 and 17, the illumination optical system 4 of FIG. 6 is partially changed, and the optical system 400D of FIG. 16 is constituted so that the illumination optical system 4A of FIG. 8 is partially changed.

Figure 13:
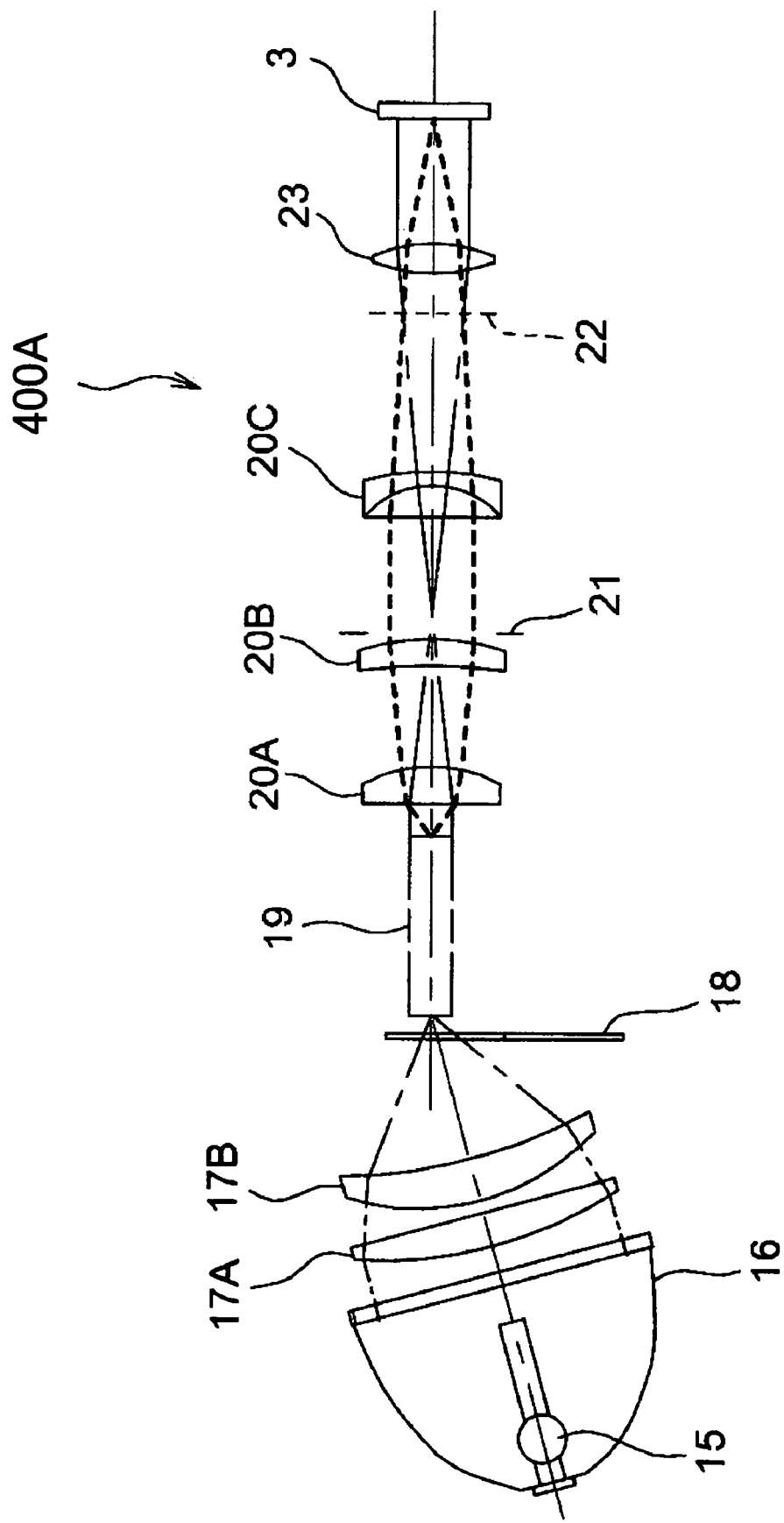
FIG. 13 is a constitutional diagram illustrating one example of the constitution of the illumination optical system for making illuminance uniform at upper and lower parts of the screen.

In the example shown in FIG. 13, the optical axis of the discharge lamp 15, the parabolic mirror 16 and the condenser lenses 17A and 17b is tilted with respect to the optical axis of the integrator rod 19. As a result, converged light flux which advances from the discharge lamp 15 via the parabolic mirror 16 and the condenser lenses 17A and 17B to the incident end surface of the integrator rod 19 tilts with respect to the optical axis of the integrator rod 19.

Figure 14:
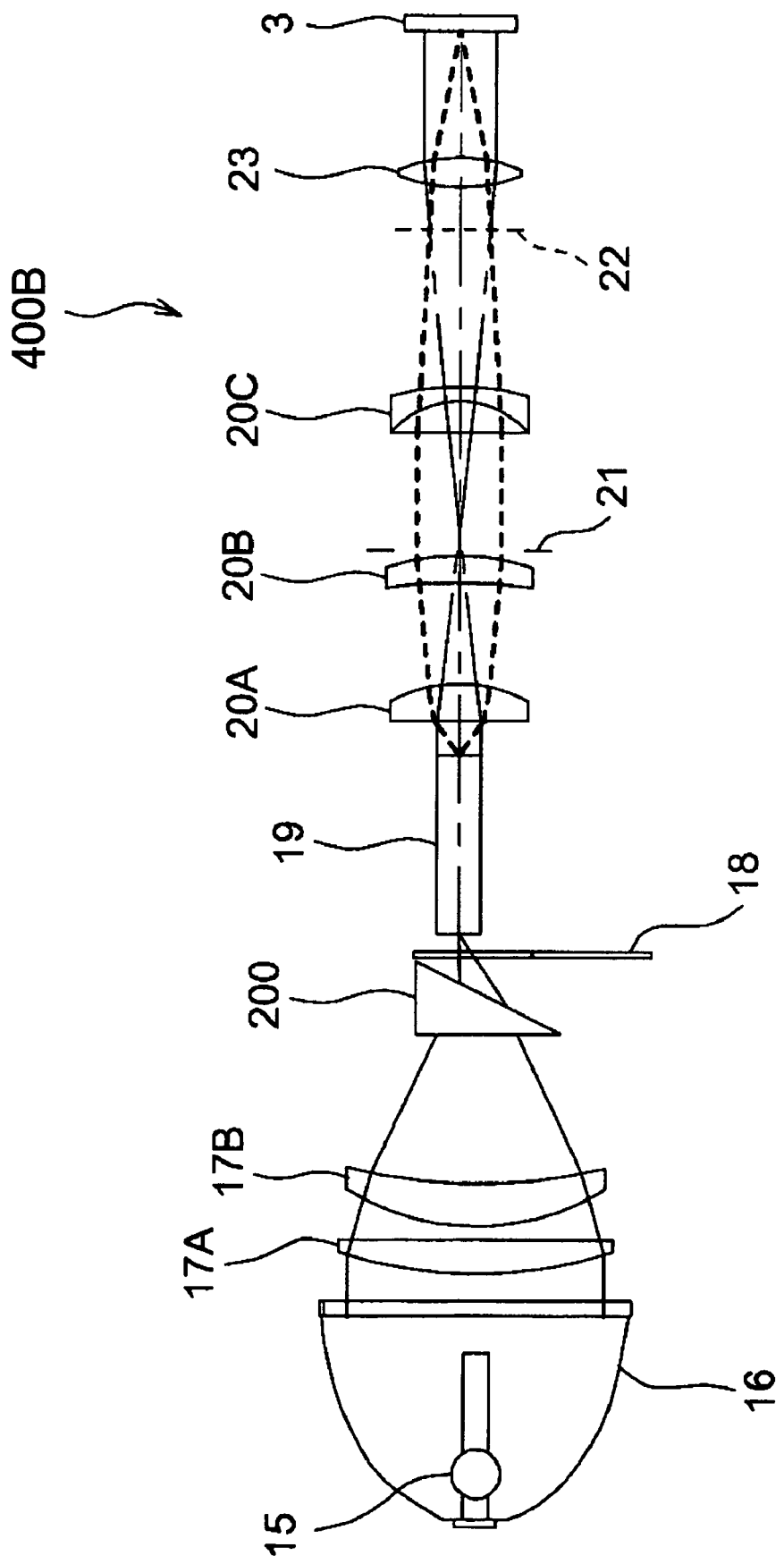
FIG. 14 is a constitutional diagram illustrating one example of the constitution of the illumination optical system for making the illuminance uniform at the upper and lower parts of the screen.

In the example shown in FIG. 14, a prism 200 is arranged on the optical path of the converged light flux from the discharge lamp 15 via the parabolic mirror 16 and the condenser lenses 17A and 17B to the incident end surface of the integrator rod 19. The converged light flux to the incident end surface bends when it transmits through the prism 200, so as to tilt with respect to the optical axis of the integrator rod 19.

Figure 15:
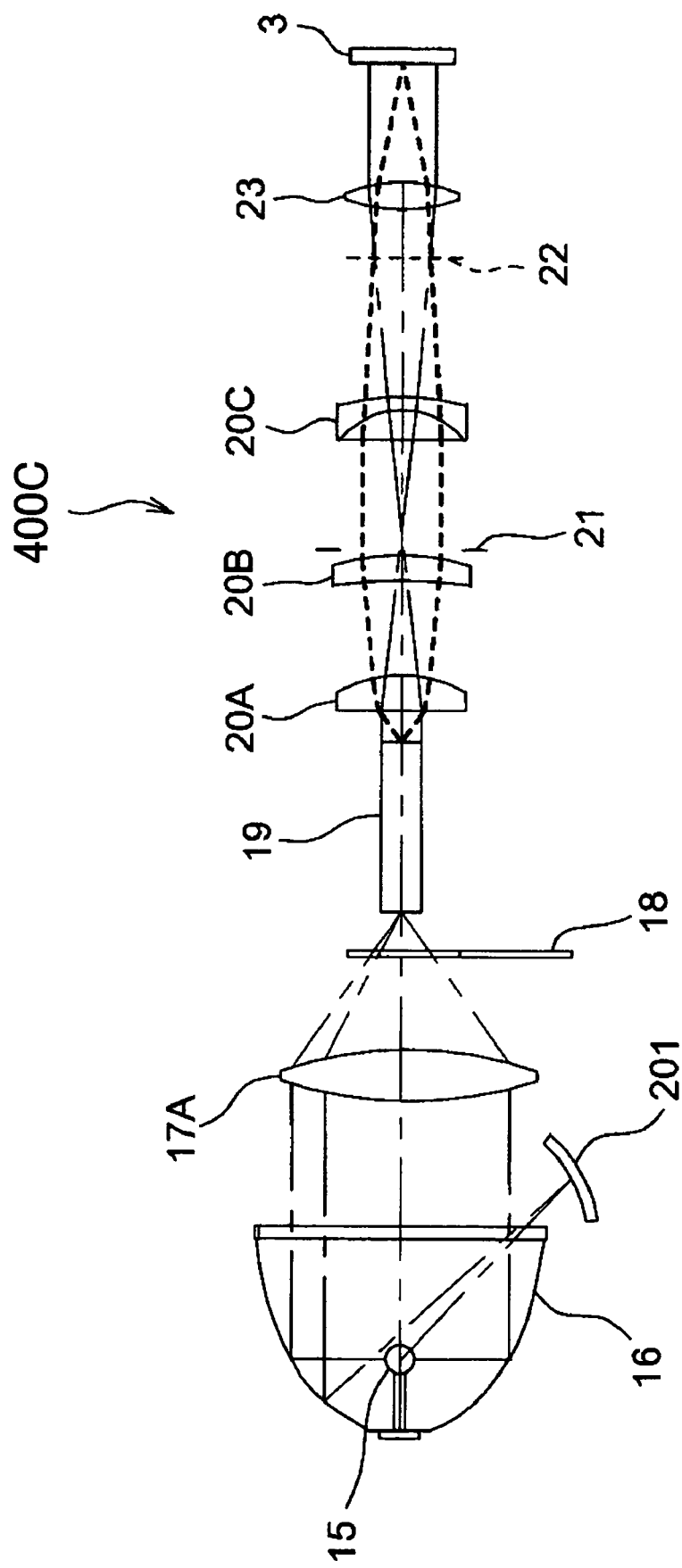
FIG. 15 is a constitutional diagram illustrating one example of the constitution of the illumination optical system for making the illuminance uniform at the upper and lower parts of the screen.
Figure 16:
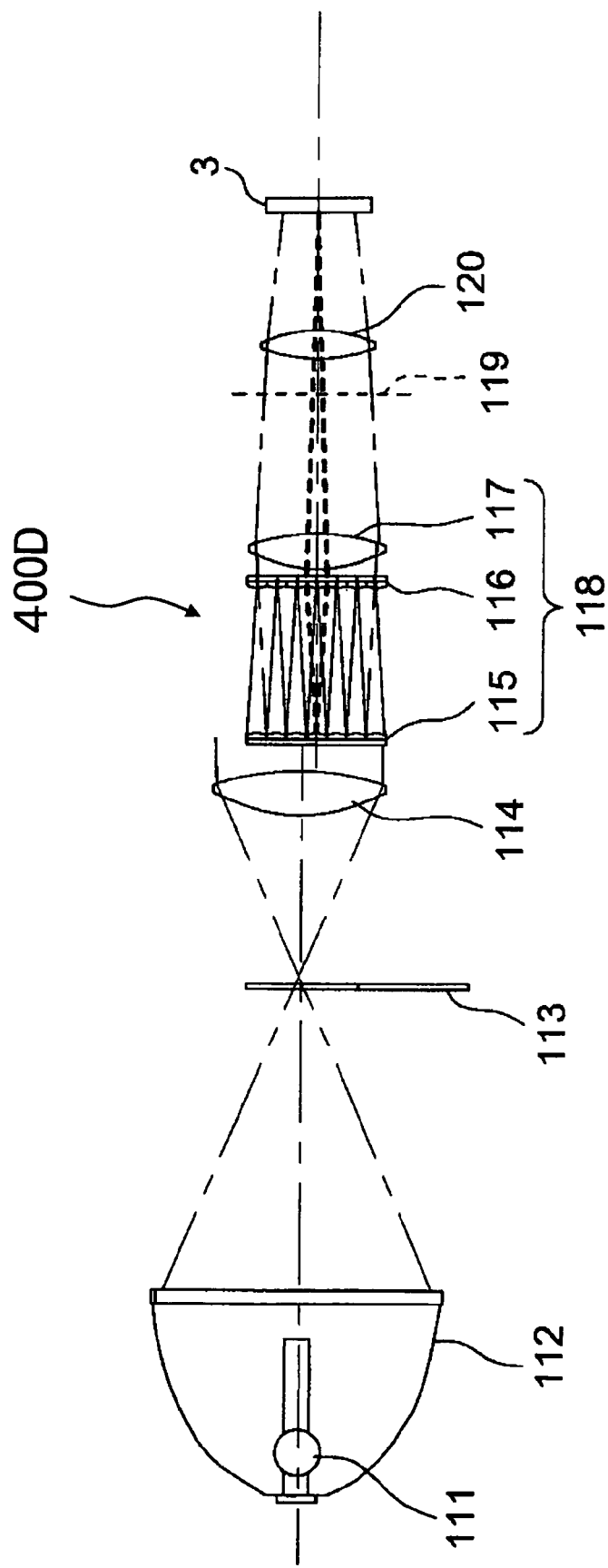
FIG. 16 is a constitutional diagram illustrating one example of the constitution of the illumination optical system for making the illuminance uniform at the upper and lower parts of the screen.

In the example shown in FIG. 15, a reflector 201 is disposed only on a part (lower side in the drawing) of a vicinity of the opening of the parabolic mirror 16. The reflector 201 reflects the light from the discharge lamp 15 which is not reflected by the reflector 16 so that the light is reflected by the reflector 16 and led to the condenser lens 17A. The reflector 201 strengthens the converged light flux which advances towards the incident end surface of the integrator rod 19 via the condenser lenses 17A and 17B so that the intensity in the upper part is stronger than that in the lower part in the drawing.

In the example shown in FIG. 16, the discharge lamp 111, the oval mirror 112, the color wheel 113 and the collimating lens 114 are arranged so as to shift upward with respect to an optical axis (center axis) of the lens-array type integrator optical system 118. As a result, since the center of the light flux emitted from the collimating lens 114 shifts upward with respect to the optical axis of the integrator optical system 118, the light flux having the asymmetrical intensity distribution in the up-down direction enters the integrator optical system 118.

Figure 17:
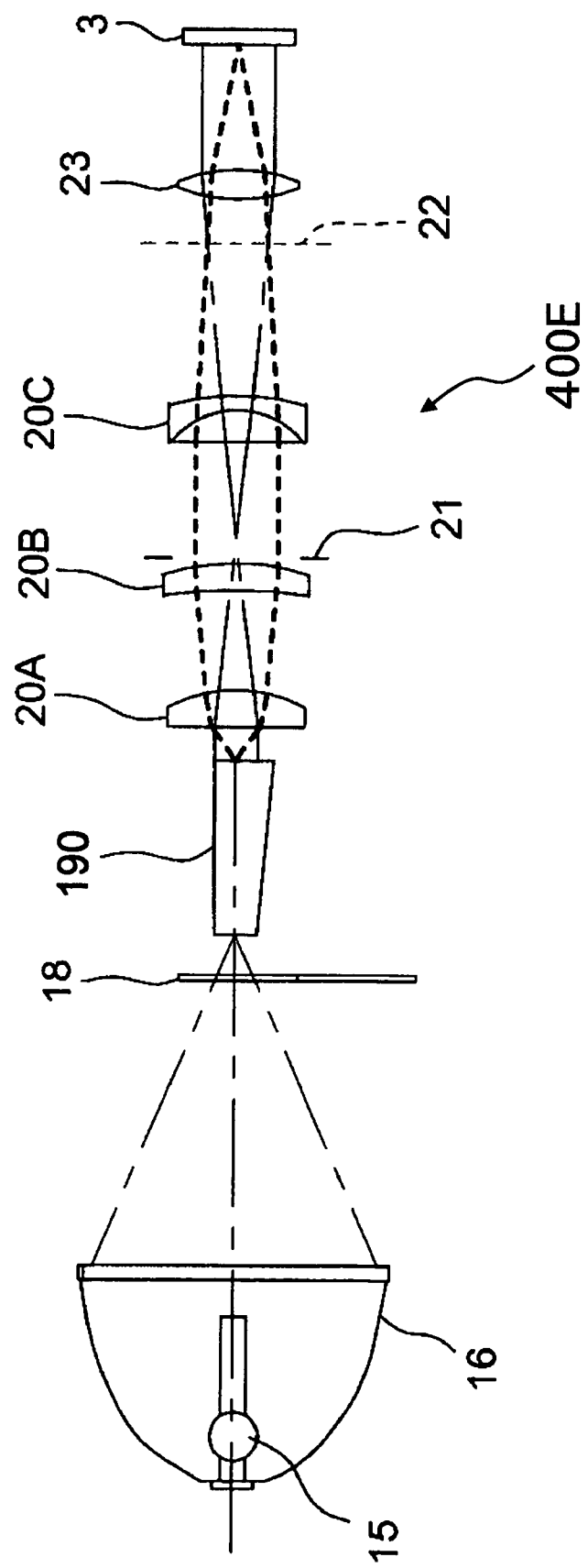
FIG. 17 is a constitutional diagram illustrating one example of the constitution of the illumination optical system for making the illuminance uniform at the upper and lower parts of the screen.

In order to obtain the above intensity distribution for the illumination light of the illumination optical system, the asymmetrical light flux may be overlapped in the integrator optical system. For example as shown in FIG. 17, one side of the integrator rod 190 may be tapered, and the emission surface of the integrator rod 190 may have a shape similar to that of the mirror plane 12 of the DMD 3. In this case, since the folding number of the light flux to enter the integrator rod 190 varies in the upper and lower directions (the folding number in the upper side is larger than the folding number in the lower side), the illumination light emitted from the emission surface of the integrator rod 190 has non-uniform intensity distribution having tilt in the up-down direction.

The disclosure in this specification includes not only the invention described in claims but also the invention for preventing the uneven illuminance of the screen in the projection type image display apparatus.

The above-mentioned embodiments are the projection type image display apparatus that modulates illumination light from the illumination optical system by means of the reflection type image forming device and enlarges to project the modulated image light on the screen by means of the projection optical system. The device is characterized in that the illumination optical system emits illumination light from below to the image forming surface of the reflection type image forming device, and the projection optical system includes a plurality of curved mirrors that lead the projection light from the reflection type image forming device to the screen in down-to-up direction, and the illumination light from the illumination optical system has the intensity distribution such that the light becomes intense from at least one of the upper side and the lower side of the image forming surface of the reflection type image forming device to the other side.

According to the embodiments, the illumination light from the illumination optical system has the intensity distribution such that the light becomes intense from at least one of the upper side and the lower side of the image forming surface of the reflection type image forming device to the other side. When, therefore, the intensity distribution of the illumination light is set on the image forming surface according to the tendency such that the illuminance of the projection light becomes lower in at least one of the upper part and the lower part of the screen, the uneven illuminance can be suppressed and the image quality can be improved. In the case where the illuminance in the upper part of the screen tends to be lower than the illuminance in the lower part, the intensity distribution may be set so that the light intensity on the side of the image forming surface corresponding to the upper part of the screen becomes stronger than that on the side corresponding to the lower part of the screen.

Concretely, the illumination optical system has the light source, and the integrator optical system that is arranged on the optical path between the light source and the reflection type image forming device. Light flux having the intensity distribution asymmetrical with respect to the optical axis of the integrator optical system enters the integrator optical system from the light source.

More concretely, the integrator optical system has the integrator rod, and the optical axis of a condensing optical system for condensing the light flux emitted from the light source tilts with respect to the optical axis of the integrator rod.

The integrator optical system has the integrator rod, and the illumination optical system has the prism which is disposed on the optical path between the light source and the integrator rod. As a result, the light flux which tilts with respect to the optical axis of the integrator rod may enter the incident surface of the integrator rod from the prism.

The integrator optical system has the integrator rod, and the illumination optical system has a condensing mirror that converges light emitted from the light source, and a reflector arranged on one side of the condensing mirror. As a result, the light flux having the intensity distribution asymmetrical with respect to the optical axis of the integrator rod may enter the incident surface of the integrator rod from the condensing mirror and the reflector.

As an alternative idea, the integrator optical system is a lens-array type integrator optical system having lens arrays, and the center of the light flux to enter the integrator optical system may be shifted from the optical axis of the integrator optical system.

The illumination optical system has the light source, and the integrator optical system which is arranged on the optical path between the light source and the reflection type image forming device, and the asymmetrical light flux may be overlapped in the integrator optical system. For example, the integrator optical system has the integrator rod whose one side is tapered.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A projection image display apparatus comprising:
    an illumination optical system configured to generate an illumination light;
    a projection optical system configured to project an image light onto a screen;
    a reflective image forming device configured to modulate the illumination light so as to form the image light, the reflective image forming device having an image forming surface on which a plurality of micromirrors are arranged two-dimensionally, a rotational angle of the micromirrors being set to at least one of first and second angles according to a picture signal input into the reflective image forming device, the micromirrors being configured to reflect the illumination light in a first direction where the light is led to the screen via the projection optical system at the first angle and to reflect the illumination light in a second direction where the light is not led to the screen at the second angle;
    a reflection mirror arranged in a position opposite to an optical path of the illumination light to enter the reflective image forming device across an optical path of the image light reflected in the first direction by the micromirrors at the first angle, the reflection mirror configured to reflect the light reflected in the second direction by the micromirrors at the second angle in a direction separated from the image light;
    a sealed structure that seals the image forming surface of the reflective image forming device and the reflection mirror; and
    a transparent member that comprises a part of the sealed structure, is arranged in a position opposed to the reflection mirror, and is configured to transmit the light reflected by the reflection mirror to an outside of the sealed structure, wherein:

the illumination optical system is arranged so as to emit the illumination light to the image forming surface of the reflective image forming device from below, the image forming surface of the reflective image forming device has a rectangular shape having a long side and short side, a rotational axis of the micromirrors is parallel with the long side of the image forming surface, and the light beams reflected to the first and the second directions by the micromirrors set at the first and the second angles are led upward, and the projection optical system has a plurality of curved mirrors that lead the image light from the reflective image forming device to the screen in a down-to-up direction.

2. The projection image display apparatus according to claim 1, wherein the reflection mirror is a concave mirror.

3. The projection image display apparatus according to claim 1, wherein the reflection mirror is configured to reflect the light reflected in the second direction by the reflective image forming device in a down direction.

4. The projection image display apparatus according to claim 1, wherein the transparent member is a glass plate.

5. A projection image display apparatus comprising:

a projection optical system configured to project an image light onto a screen;

an optical component holding member holding at least one optical component of the projection optical system;

a reflective image forming device configured to separate an illumination light into image light to be projected onto the screen and other unnecessary light according to an input signal thereto;

a reflection element configured to reflect the unnecessary light arranged in a space between the reflective image forming device and the projection optical system; and a first transparent member;

wherein the reflective image forming device is held by the optical component holding member via an image forming device holder;

wherein the optical component holding member has a tube portion having a first opening, the image forming device holder is held to the first opening, and the optical component holding member has a second opening for leading the unnecessary light reflected by the reflection element to the outside of the optical component holding member;

wherein the first transparent member covers the second opening; and wherein the reflection element is configured to reflect the unnecessary light not towards the projection optical system but towards an optical path of the illumination light.

6. The projection image display apparatus according to claim 5, wherein the reflection element is held by the optical component holding member.

7. The projection image display apparatus according to claim 5, wherein the projection optical system has a plurality of curved mirrors, and the apparatus is configured so that a center principal ray of the image light, a center principal ray of the unnecessary light, and a center principal ray of the illumination light entering the reflective image forming device are on the same plane.

8. A projection image display apparatus comprising:

a projection optical system configured to project an image light onto a screen;

an optical component holding member holding at least one optical component of the projection optical system;

a reflective image forming device configured to separate an illumination light into image light to be projected onto the screen and other unnecessary light according to an input signal thereto;

a reflection element configured to reflect the unnecessary light arranged in a space between the reflective image forming device and the projection optical system;

a first transparent member; and a second transparent member arranged on an optical path of the image light between the reflective image forming device and the projection optical system and being held by the optical component holding member;

wherein the reflective image forming device is held by the optical component holding member via an image forming device holder;

wherein the optical component holding member has a tube portion having a first opening, the image forming device holder is held to the first opening, and the optical component holding member has a second opening for leading the unnecessary light reflected by the reflection element to the outside of the optical component holding member;

wherein the first transparent member covers the second opening; and wherein the optical component holding member, the reflective image forming device, the image forming device holder, the first transparent member, and the second transparent member surround a space between the reflective image forming device and the projection optical system.

9. The projection image display apparatus according to claim 5, wherein the reflective image forming device is a digital micromirror device.

10. The projection image display apparatus according to claim 4, wherein the reflection mirror is a concave mirror.

11. The projection image display apparatus according to claim 7, further comprising:

a second transparent member arranged on an optical path of the image light between the reflective image forming device and the projection optical system and being held by the optical component holding member, wherein the optical component holding member, the reflective image forming device, the image forming device holder, the first transparent member, and the second transparent member surround a space between the reflective image forming device and the projection optical system.

* * * * *